United States Patent [19]

Bruhn

[11] Patent Number: 4,932,133

[45] Date of Patent: Jun. 12, 1990

[54] POST-AVALANCHE AID DEVICE

[75] Inventor: David E. Bruhn, Bloomington, Minn.

[73] Assignee: Upward, Inc., Bloomington, Minn.

[21] Appl. No.: 361,636

[22] Filed: Jun. 5, 1989

[51] Int. Cl.$^5$ .............................................. G01C 9/20
[52] U.S. Cl. ...................................................... 33/377
[58] Field of Search .............. 33/377, 365, 348, 348.2, 33/370, 373; 116/215, 263

[56] References Cited

U.S. PATENT DOCUMENTS

| D. 180,624 | 7/1957 | Souter | 33/373 |
|---|---|---|---|
| 3,188,748 | 6/1965 | Moody | 33/373 |
| 3,978,591 | 9/1976 | Jaaskelainen | 33/373 |
| 4,407,075 | 10/1983 | MacDermott et al. | 33/348.2 |

FOREIGN PATENT DOCUMENTS 2754030 6/1979 Austria ................. 33/348.2

*Primary Examiner*—William A. Cuchlinski, Jr.
*Assistant Examiner*—William C. Dowling

[57] ABSTRACT

A post-avalanche upward indicating aid device is provided. The device includes a body, an illumination source and an attachment means. The body has a generally central cavity which is partially filled with a liquid and closed or sealed. The illumination source enables the liquid in the cavity to be observed in darkness and an attachment point is provided so that the device can be securely fastened to or carried by a user.

The aid device incorporates the effect of gravity on a liquid contained in a closed, partially liquid-filled cavity. That is, gravity draws the liquid in the partially liquid-filled cavity in a downward direction so that the partially-empty area or bubble in the cavity will always tend toward a position above the liquid. Thus, by observing the location of the bubble in the central cavity, the device provides an automatic, immediate and readily visible indication of the generally upward direction to a victim buried in snow after being caught in an avalanche.

3 Claims, 1 Drawing Sheet

POST-AVALANCHE AID DEVICE

FIELD OF THE INVENTION

This invention relates generally to recreational safety devices and, more particularly, to a post-avalanche aid device that provides a quick, readily visible indication of vertical orientation and, specifically, the upward direction.

BACKGROUND OF THE INVENTION

Avalanche safety and survivability devices are known. An unaddressed problem is that known safety devices only assist and, in fact, rely upon search and rescue teams coming to aid a victim. That is, they do not, independent of search and rescue operations, improve the survival chances of an individual caught or buried in an avalanche. The present invention incorporates the known effect of gravity on a liquid contained in a partially liquid-filled, sealed container and an illumination source to meet this unaddressed problem.

There are many methods and devices which rely upon the influence of gravity on liquid to display horizontal or vertical orientation or degree of inclination from either. In the building trades for example, such devices take the form of simple bubble or spirit levels. While these devices are well suited for their intended use, for obvious reasons it is impracticable for a person to carry such equipment while engaged in a recreational activity such as skiing or backpacking in an area where avalanches might occur.

Level indicating devices have been applied in some recreational uses. U.S. Pat. No. 4,745,687 discloses a level indication device for use with recreational vehicles. The device comprises a base on which is mounted a liquid containing enclosure carrying a pair of spaced parallel lines. When the surface of the liquid is located between the lines the bottom surface of the base will be within three degrees from level with respect to the horizontal plane. This device is designed to be attached to a recreational vehicle and, again, it would be impractical for a person to use while engaged in a recreational activity such as skiing.

With direct regard to avalanche safety or survivability devices, the long-felt need for such devices is manifested by the profusion of available equipment. Typically, these devices are position-indicating devices designed to be used by persons venturing, either purposefully or by accident, into avalanche-prone areas. If a person carrying one of these devices is caught in an avalanche, the device enables rescue teams to locate the person. This type of equipment includes "break-apart" items such as ski-poles, parts of which, attached to the person or other equipment by a cord or ribbon, may rise to the surface of the snow and be spotted by a rescue team which then follows the cord to the location of the buried person. Balloon, flare or dye-releasing devices are known also, but one of the most commonly used devices is the beacon-generating device. These are well-known in the literature and are well-represented by commercially available transmitting/receiving devices.

The beacon and other location-indicating devices represent years of concern about avalanche survivability and certainly have increased victims' chances for surviving avalanches. However, this type of device has a fundamental limitation. They are predicated on the requirement that an outside agency, i.e., a person or group of persons such as a search and rescue team, will perceive the indication provided by the device, locate and then dig out and assist the victim.

A person caught or buried in an avalanche will be extremely disoriented and, after only a brief period of time, a buried victim's survival chances become very low due to hypothermia, shock or suffocation. Therefore, it is extremely important that a victim quickly learn the direction of the surface and begin to try to reach it. Despite the advances in avalanche safety devices, there remains an unaddressed need for a simple, easily portable, reliable device that an individual caught or buried in an avalanche can use immediately without relying on outside assistance to determine the upward direction and thus increase the chances for surviving.

DISCLOSURE OF THE INVENTION

The problem outlined above is in large part solved by the personal post-avalanche aid device in accordance with the present invention. The device incorporates a closed liquid-containing body, partially filled with liquid, and an illumination source. The device is easily portable and provides an automatic, readily visible indication of the upward direction.

It is a primary object of the present invention to provide a reliable, simple and inexpensive device that increases the chances that an individual caught or buried in an avalanche will survive independent of search and rescue operations.

A specific object of the present invention is to provide a simple, easily portable, upward direction indicating post-avalanche aid device which has a sealed, liquid-containing body partially filled with liquid so that, under the influence of gravity, the device provides a reliable, easily perceived indication of the upward direction.

Another object of the present invention is to provide a simple, easily portable, gravity responsive upward indicating post-avalanche aid device that produces a readily perceived indication of the upward direction in the absence of light.

Another object of the present invention is to provide a simple, easily portable upward indicating post-avalanche aid device that may be securely and conveniently attached to the body of a person or to an article of clothing or equipment worn or carried by a person.

These and other objects of the present invention are achieved by providing a post-avalanche, upward indicating aid device having a closed body with a generally central liquid containing cavity partially filled with liquid, a source of illumination and an attachment portion or point for attaching the device to a person's body or to an article of clothing or equipment worn or carried by a person.

Other objects and advantages of the present invention will be understood with reference to the following specification and appended drawings and claims.

BEST MODE FOR CARRYING OUT THE INVENTION

Figure 1:
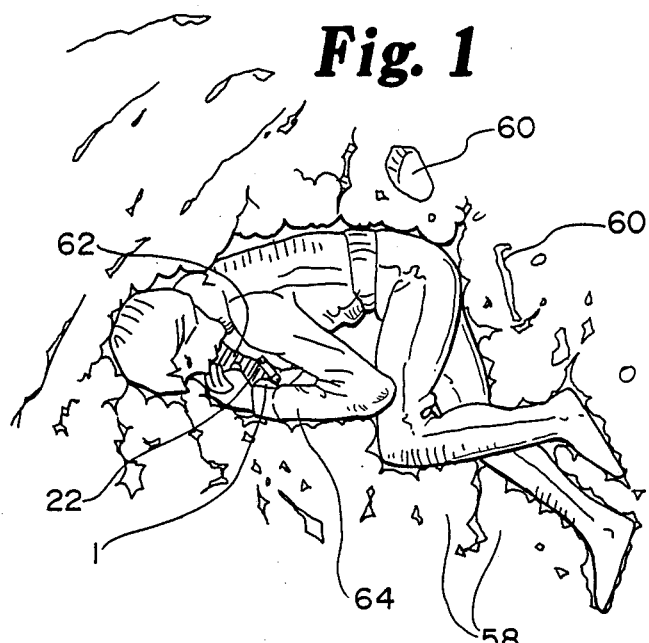
FIG. 1 is a pictorial view of a person buried in snow and debris from an avalanche and wearing the post-avalanche aid device.

Referring to the drawings, the post-avalanche aid device in accordance with the present invention is indicated generally and illustratively at 1 in FIG. 1. The aid device includes a body, an attachment portion or point and an illumination source, indicated respectively at 3, 6, 9.

Figure 3:
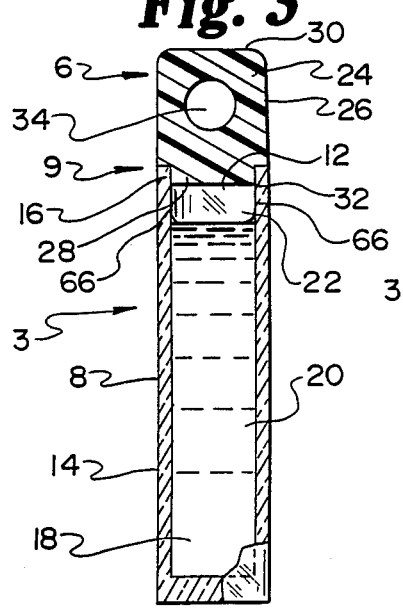
FIG. 3 is a side elevational view of the subject with parts cut away.

FIG. 3 shows that the body 8 of the post-avalanche aid device has a first end 7 closed by base or wall 10, a second open end 12, and side wall(s) 14. At the open end 12, the side wall(s) provide a shoulder 16. The body includes an interior, generally central liquid-receiving cavity 18 encapsulated and defined by the body walls. The cavity is elongated, extending between the ends of the body, and may be generally tubular. The body wall thickness is relatively thin compared to the diameter of the cavity and the wall thickness may be varied, but adequate strength, fracture resistance and clarity must be maintained; a thickness in the range of 0.10 inch is preferred. As long as it is transparent upon curing, the body may be formed of any suitable fracture-resistant thermoplastic material such as various plastics or acrylics; polycarbonate is one such material. A typical thermoplastic injection molding process may be used to form the body.

The cavity 18 is partially filled with a liquid 20 and sealed or closed, thereby providing a partially empty area or bubble 22. The liquid may be any suitable freezing-resistant liquid or solution such as an oil or alcohol containing liquid. Under the influence of gravity, the liquid will be drawn downward and the bubble will always tend toward a position above the liquid. As long as the bubble or partially empty area is clearly formed and a unambiguous indication of the gravitational effect may be perceived, any amount of liquid may be used to partially fill the cavity. It is preferred that the cavity be approximately two-thirds full of liquid.

Figure 2:
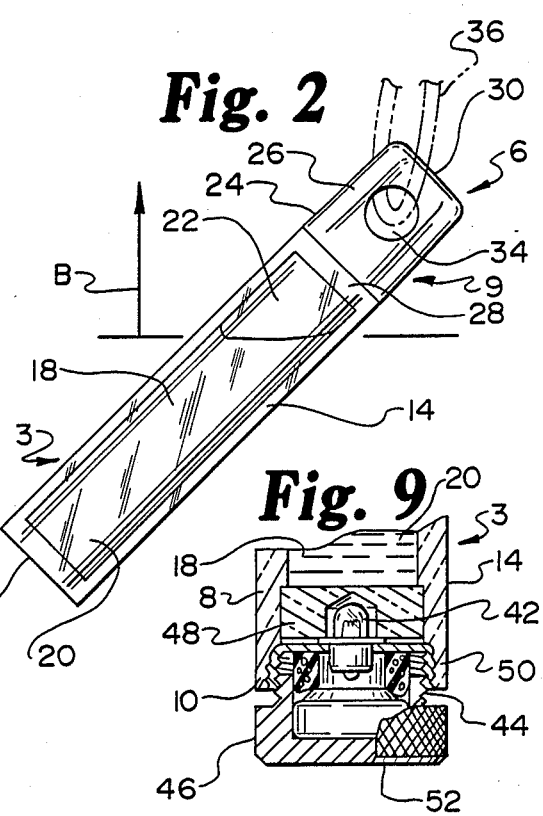
FIG. 2 is a pictorial drawing of the subject of the invention, diagramming the function thereof. The figure includes arrow B indicating the vertical or upward direction.
Figure 7:
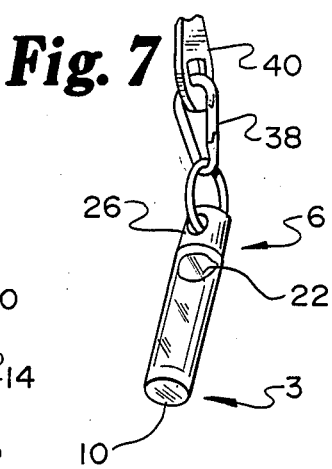
FIG. 7 is a perspective view showing the subject invention suspended by attaching hardware to an article of clothing.
Figures 6, 8:
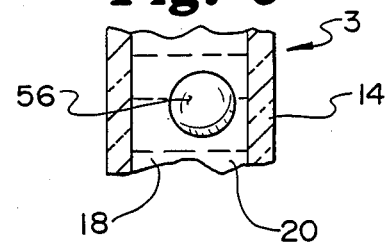
FIG. 6 is a fragmentary detail showing a third alternate form of invention.
FIG. 8 is a perspective view showing the subject invention in conjunction with a lanyard.

With further reference to FIGS. 2 and 3, at open body end 12, a closing or sealing cap 24 is provided. The cap includes or forms an attachment point or nipple 26. The cap has a first end 28, and a second end 30 and is generally frusto-conical. First end 28 has a stepped area 32 which is complementary to and first with body shoulder 16. For strength, aesthetics and to minimize possible injury to a person using the device, the end 30 furthest from the body may be rounded in the range of six degrees. Between the ends of the cap, and preferably closer to the end 28 nearest the body, the cap has an aperture 34. The aperture extends through the cap attachment nipple and, as shown in FIGS. 7 and 8, has a diameter suitable for receiving a lanyard 36 or other attaching hardware 38 so that the aid device may be tied or appended to a person's body or article 40 of clothing or equipment worn or carried by a person. The cap, closing the cavity and providing the attachment point or nipple, may be molded integrally with the body or may be secured thereto by adhesives or by welding.

Figure 4:
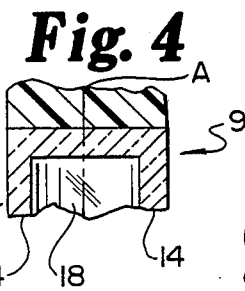
FIG. 4 is a fragmentary detail, including phantom line A, showing a first alternate form of invention.

As shown in FIGS. 2–5, the illumination source, indicated generally at 9, is integrated with the cap 24 or body 8. During the molding process, a proportion, in the range of five to thirty percent, of phosphorescent material or pigment is added to the thermoplastic being used to form the body and/or cap, thereby impregnating the thermoplastic. Among others, typical phosphorescent materials that may be used are represented by GLO pigment P-1000 or a mixture such as calcium-sulfide strontiumsulfide. FIG. 4 shows an alternative embodiment of the aid device in which the body and cap are molded together. Phantom line A bisects the integrally formed aid device and the illumination source 9 may extend 180 degrees around the central cavity 18, but, as long as the bubble 22 is visible through the body 8, it may extend nearly completely therearound or only to the minimum necessary to adequately light the central cavity and make the bubble visible in the dark. The degree or amount of the body or cap including the phosphorescent material may be varied as the proportion of the material impregnating the thermoplastic is varied.

Figure 9:
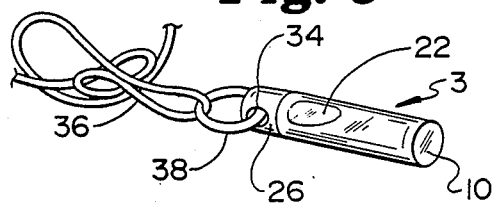
FIG. 9 is a fragmentary side elevational detail with parts cut away of a fourth alternate form.
Figure 5:
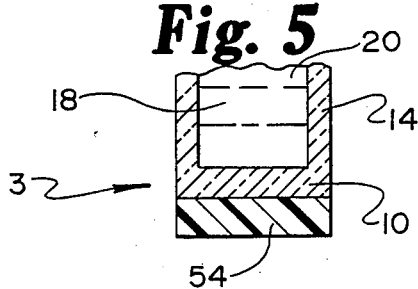
FIG. 5 is a fragmentary detail showing a second alternate form of invention.

There are other alternative embodiments of the post-avalanche aid device that are within the scope of the present invention. For example, as shown in FIG. 9, the aid device may incorporate an illumination source such as a battery-powered, twist-activated incandescent lamp or LED light source 42. In this embodiment, the lamp or LED, power supply or battery 44 and the actuator 46 are at the base end 10 of the body 8. A base plug 48 is provided to house the lamp 42 and to seal the liquid 20 into the cavity. An inverted threaded cup 50 seats the lamp and receives the actuator, which may be a knurled metal or plastic knob 52. FIG. 5 shows an alternative embodiment wherein an additional illumination source is provided by a base cap 54 impregnated with phosphorescent material. Also, horizontal or vertical bands of phosphorescent material, as well as other indicia, may be coated or applied in or on the body. The liquid in the central cavity may itself be phosphorescent, that is, impregnated with or in solution with phosphorescent material. As shown in FIG. 6, a phosphorescent float or bead 56 having a specific gravity less than that of the liquid may be used in the central cavity. Of course, the configuration of the aid device and/or the generally central cavity may be varied. For example, a spherical configuration could be used.

As in structure, the use of the post-avalanche aid device of the present invention is very simple and very reliable. For illustrative purposes, FIG. 1 depicts the aid device in use by a person buried in snow 58 and debris 60 following an avalanche. Air spaces 62 are shown. The aid device 1 is worn or carried outside the clothing a person is wearing, for example, on a jacket or pocket zipper pull or around the neck, or in this instance, the wrist 64. Prior to an avalanche or fall, exposure to light automatically recharges the phosphorescent illumination source as the aid device is being carried or worn. Gravity acts constantly and automatically on the liquid and the bubble. If and when a person carrying the aid device is caught and buried in an avalanche or in deep powdery snow, whether in darkness or light, by glancing at the device the victim will receive an immediate, automatic, readily visible and easily perceived indication of the generally upward direction. In addition, the person may manipulate the device so that the bubble is at either end of the device, or in other words, extends an equal distance 66 along the side walls of the cavity, as shown in FIG. 3. Comparing the bubble 22 shown in FIG. 2 and FIG. 3, it will be appreciated that when this manipulation is done, the end of the aid device at which the bubble is will be pointing in and indicate nearly precisely the vertical or upward direction. With regard to carrying or securing the aid device to a person or an article of clothing or equipment, alternative methods may include pin, snap or friction attachment methods, either on the end or side wall of the device. Also, the aid device may be integrally attached or mounted in or on articles of clothing or equipment.

COMMERCIAL AND INDUSTRIAL APPLICABILITY

Wintertime and backcountry recreational activities are increasingly popular. These activities include downhill and crosscountry skiing, snowmobiling, "extreme skiing", mountain climbing and hiking; all may be, and frequently are, undertaken in areas where avalanches occur. For safety's sake, persons engaged in these activities may use the post-avalanche aid device of the present invention to increase, independent of post-avalanche search and rescue operations, their survival chances should they be caught or buried in an avalanche or in deep powdery snow.

I claim:

1. An upward direction indicating aid device comprising:
   a body molded from a thermoplastic material, said body having a first end, a second end and sidewalls, said body having a generally central cavity extending between and encapsulated by said ends and said sidewalls;
   a freezing-resistant liquid partially filling said cavity;
   an illumination means for illuminating said liquid contained in said cavity, said illumination means further comprising a phosphorescent illumination source integrated with said device; and
   an attachment means for attaching said device to a person or to an article of clothing or equipment carried or worn by a person.

2. An upward direction indicating aid device comprising:
   a body molded from a thermoplastic material, said body having a generally central cavity encapsulated by said body;
   a freezing-resistant liquid partially filling said cavity;
   an illumination means for illuminating said liquid contained in said cavity, wherein said illumination means is a phosphorescent illumination source integrated with said device by adding a predetermined portion of phosphorescent material to said thermoplastic material from which said device is molded; and
   an attachment means for attaching said device to a person or to an article of clothing or equipment carried or worn by a person, wherein said attachment means is a cap having a connector receiving aperture, said cap extending outwardly away from said body.

3. An upward direction indicating aid device according to claim 1, wherein said illumination means is a LED light source.

* * * * *

UNITED STATES PATENT AND TRADEMARK OFFICE
CERTIFICATE OF CORRECTION

PATENT NO. : 4,932,133

DATED : June 12, 1990

INVENTOR(S) : David E. Bruhn

It is certified that error appears in the above-identified patent and that said Letters Patent is hereby corrected as shown below:

```
In column 3, line 58, delete the word "first" and
insert therefor --fits--.

In column 4, line 14, delete the word "strontiumsulfide"
and insert therefor --strontium-sulfide--.
```

Signed and Sealed this

Twenty-first Day of January, 1992

Attest:

HARRY F. MANBECK, JR.

*Attesting Officer*   *Commissioner of Patents and Trademarks*